(12) United States Patent
Wood

(10) Patent No.: US 8,528,877 B2
(45) Date of Patent: Sep. 10, 2013

(54) LATCHING GAS ON/OFF ASSEMBLY

(75) Inventor: Jack Kingsley Wood, Chesire (GB)

(73) Assignee: Planet Eclipse Limited, Trafford Park, Manchester (GB)

( * ) Notice: Subject to any disclaimer, the term of this patent is extended or adjusted under 35 U.S.C. 154(b) by 92 days.

(21) Appl. No.: 13/165,234

(22) Filed: Jun. 21, 2011

(65) Prior Publication Data

US 2011/0315239 A1 Dec. 29, 2011

Related U.S. Application Data

(60) Provisional application No. 61/357,766, filed on Jun. 23, 2010.

(51) Int. Cl.
*F16K 35/00* (2006.01)
*F41B 11/32* (2006.01)
*F41B 11/06* (2006.01)

(52) U.S. Cl.
USPC ........... 251/113; 251/102; 251/144; 251/148; 251/291; 124/73

(58) Field of Classification Search
USPC ............. 251/89, 90, 101, 102, 111, 113, 144, 251/148, 291; 124/71, 73, 76; 285/317
See application file for complete search history.

(56) References Cited

U.S. PATENT DOCUMENTS

| | | | | |
|---|---|---|---|---|
| 1,372,297 A * | 3/1921 | Kennedy | ........................ | 285/280 |
| 4,069,686 A * | 1/1978 | Hoelman | ......................... | 62/292 |
| 6,062,208 A * | 5/2000 | Seefeldt et al. | .................. | 124/71 |
| 6,929,290 B2 * | 8/2005 | Don | .............................. | 292/169 |
| 7,097,627 B2 * | 8/2006 | Enzerink et al. | ................. | 602/23 |
| 7,600,509 B2 * | 10/2009 | Gabrel | ............................. | 124/73 |
| 2007/0251515 A1 * | 11/2007 | Gabrel | ............................. | 124/73 |

* cited by examiner

*Primary Examiner* — Eric Keasel
*Assistant Examiner* — Daphne M Barry
(74) *Attorney, Agent, or Firm* — Barlow, Josephs & Holmes, Ltd.

(57) ABSTRACT

The latching gas ON/OFF assembly includes a housing with a female threaded bore for receiving a male threaded neck of a gas tank cylinder having a tank valve with a pin. A bonnet is slidably connected to the housing and slides between a forward OFF position and rearward ON position. A pin depressor connected to the bonnet with a transverse latch button for locking the bonnet in the ON position and for releasing the bonnet from the ON position. When the bonnet is slid to the rearward ON position it causes the pin depressor to contact the pin of the tank valve to permit gas to flow therefrom. The latching button is spring-biased toward a locked position where a plate on the free end thereof removably resides in a complementary seat in the housing.

5 Claims, 19 Drawing Sheets

LATCHING GAS ON/OFF ASSEMBLY

CROSS REFERENCE TO RELATED APPLICATION

This application is related to and claims priority from earlier filed provisional patent application Ser. No. 61/357,766, filed Jun. 23, 2010, the entire contents thereof is incorporated herein by reference.

BACKGROUND OF THE INVENTION

The invention relates generally to paintball markers. More specifically, the present invention relates to the supply of gases to the marker to enable it to operate and launch a projectile.

In the sport of paintball, the paintball markers are powered by typically by compressed air, hydrogen or carbon dioxide. These gases are stored in cylinders that attach to the marker with, normally, a common threaded fitting. The cylinders that are attached to such an adapter assembly generally have a "pin valve" assembly as a means of keeping the gases retained in the cylinder. Pin valves allow free low of gases into the cylinder, but prevent flow out of the cylinder unless the pin in the assembly is depressed. This is a common area known to the art.

It is normal for the cylinder to screw into an adapter attached to the paintball marker, or gas line to the marker. This adapter is then used to allow or deny flow of gases to the marker. They are generally referred to as "ON/OFF" assemblies as they allow the gas supply from the cylinder to the marker to be turned on and off.

To permit gas to exit the cylinder and then flow into the marker, there must be some type of ON/OFF assembly or adapter that is arranged to depress the pin in the Pin Valve assembly of the cylinder to allow flow of gases from the cylinder into the paintball marker.

This can be carried out in many different ways. For example, in the prior art, there are several different designs of ON/OFF assemblies ranging from lever operated, tap operated, or knob operated. These often require multiple turns of a knob to go from the ON position to the OFF position. Some require a one-quarter turn of a tap to turn allow flow, and a one-quarter turn to prevent flow. Lever-based interconnection assemblies require an unnatural motion to flip the lever to the appropriate position across a long throw. In general, the foregoing gas interconnection assemblies are not well suited for use in a paintball marker, particularly during gameplay.

In view of the foregoing, there is a demand for a latching gas ON/OFF assembly that is easy and fast to operate. There is a need for such an assembly to require little effort by the user to lock and unlock the cylinder interconnection.

SUMMARY OF THE INVENTION

The present invention preserves the advantages of prior art gas interconnection assemblies for paintball markers. In addition, it provides new advantages not found in currently available assemblies and overcomes many disadvantages of such currently available assemblies.

The present invention is directed to a new and novel assembly for controlling the flow of gas from a supply cylinder to a paintball marker. The latching gas ON/OFF assembly includes a housing with a female threaded bore for receiving a male threaded neck of a gas tank cylinder having a tank valve with a pin. A bonnet is slidably connected to the housing and slides between a forward OFF position and rearward ON position. A pin depressor connected to the bonnet with a transverse latch button for locking the bonnet in the ON position and for releasing the bonnet from the ON position. When the bonnet is slid to the rearward ON position it causes the pin depressor to contact the pin of the tank valve to permit gas to flow therefrom. The latching button is spring-biased toward a locked position where a plate on the free end thereof removably resides in a complementary seat in the housing.

It is therefore an object of the present invention to provide an assembly for controlling the flow of gas from a gas supply cylinder to a paintball marker.

Another object of the present invention is to provide a latching gas ON/OFF assembly that quickly and easily turns on and off the flow of gas.

A further object of the present invention is to provide a latching gas ON/OFF assembly that includes a linear/in-line operation, which is more natural for switching during paintball gameplay.

Yet another object of the present invention is to provide a latching gas ON/OFF assembly that quickly moves to a locked ON position without pressing any buttons or moving any levers.

Another object of the present invention is to provide a latching gas ON/OFF assembly that requires minimal movement and actuation to effectuate the turning on and off of gas flow.

Another object of the present invention is to provide a latching gas ON/OFF assembly that will vent gases stored in the paintball marker when the ON/OFF assembly is in the OFF position.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

The present invention is directed to a new and novel latching or locking gas ON/OFF assembly 10 that interconnects a paintball marker 12 to a cylinder 14 containing a gas supply for operation of the marker. Details of the present invention are discussed below in connection with the attached drawing figures.

The ON/OFF assembly of the present invention of this device 10 is new and novel in that it has no rotary device as seen on any prior art. Instead, it has a linear (in-line) actuator that can be "pulled" or "pushed" into a position that opens the pin valve and then "locks" or "latches" into place. This is a much more natural motion that the motion that is required to operate prior art ON/OFF assemblies. Once locked in place it retains the actuator and hence the pin valve in the open position, allowing flow of gases from the cylinder into the marker for operation thereof.

Figure 14:
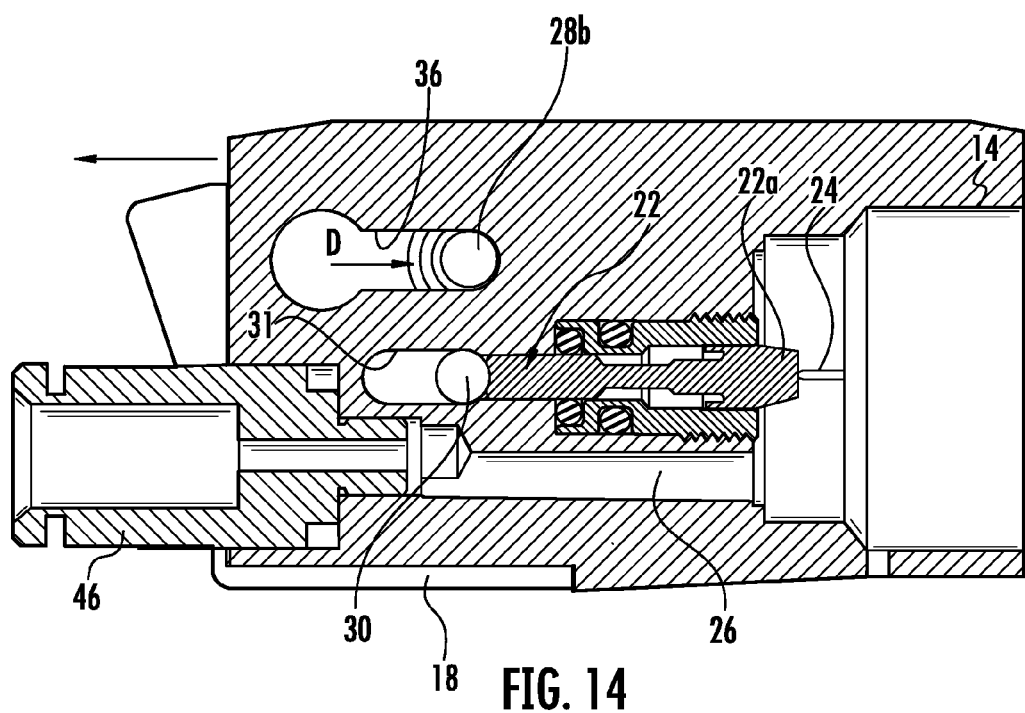
FIG. 14 is a longitudinal cross section of FIG. 12 with gas ON with for illustration purposes.
Figure 15:
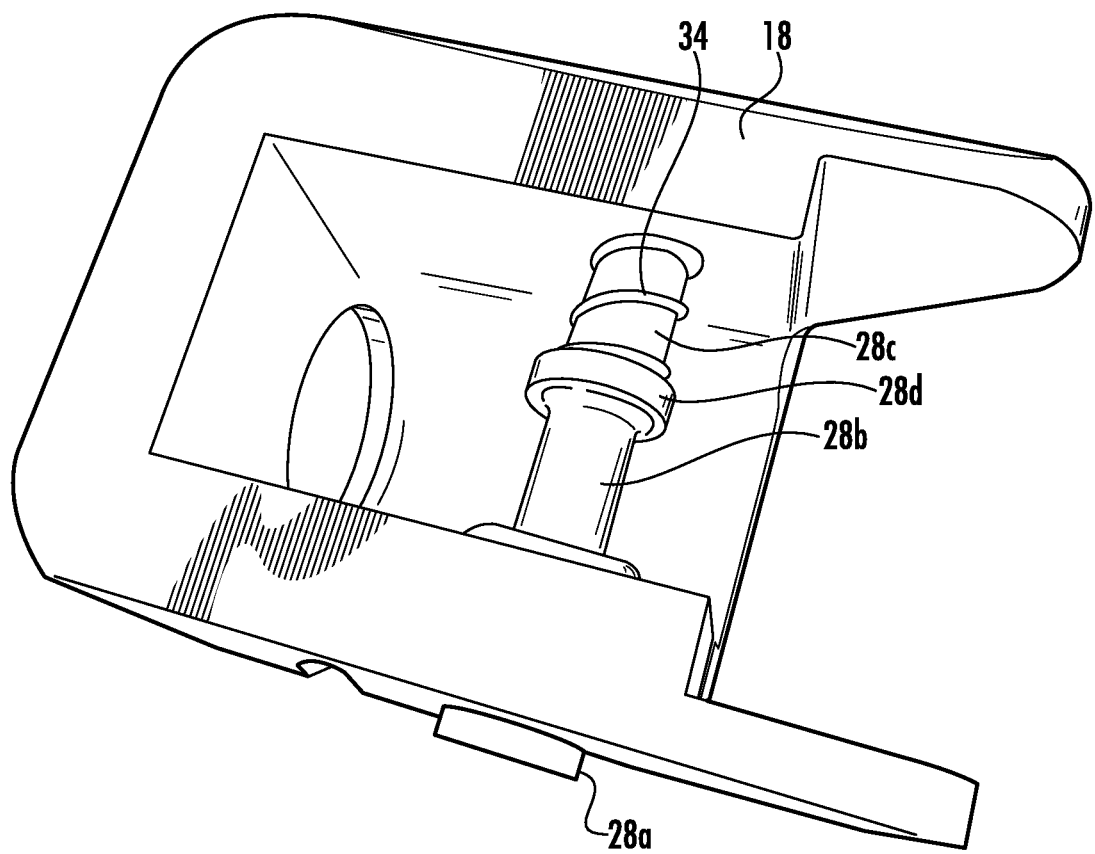
FIG. 15 is a bottom perspective view of the latch button spring-biased toward a locking position against the inside of the bonnet.
Figure 16:
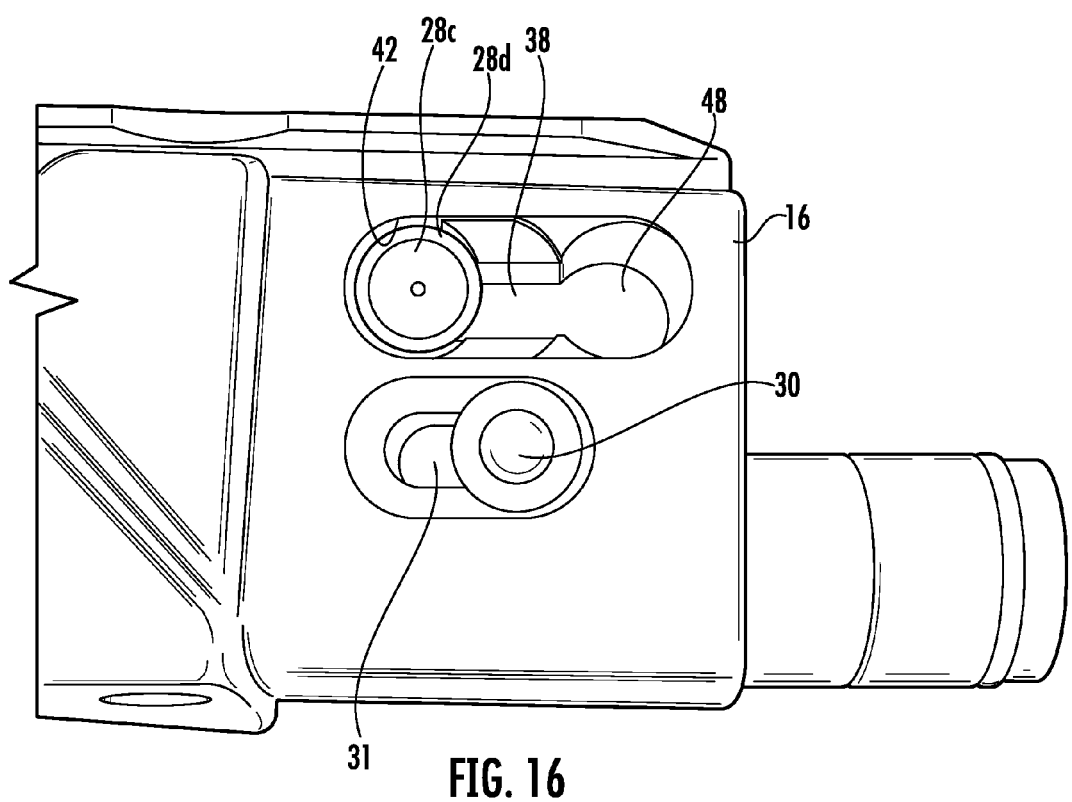
FIG. 16 is a side view of the rear side of the housing with the plate of the latch button in a leftmost portion of the slot when the gas is in an ON position.
Figure 17:
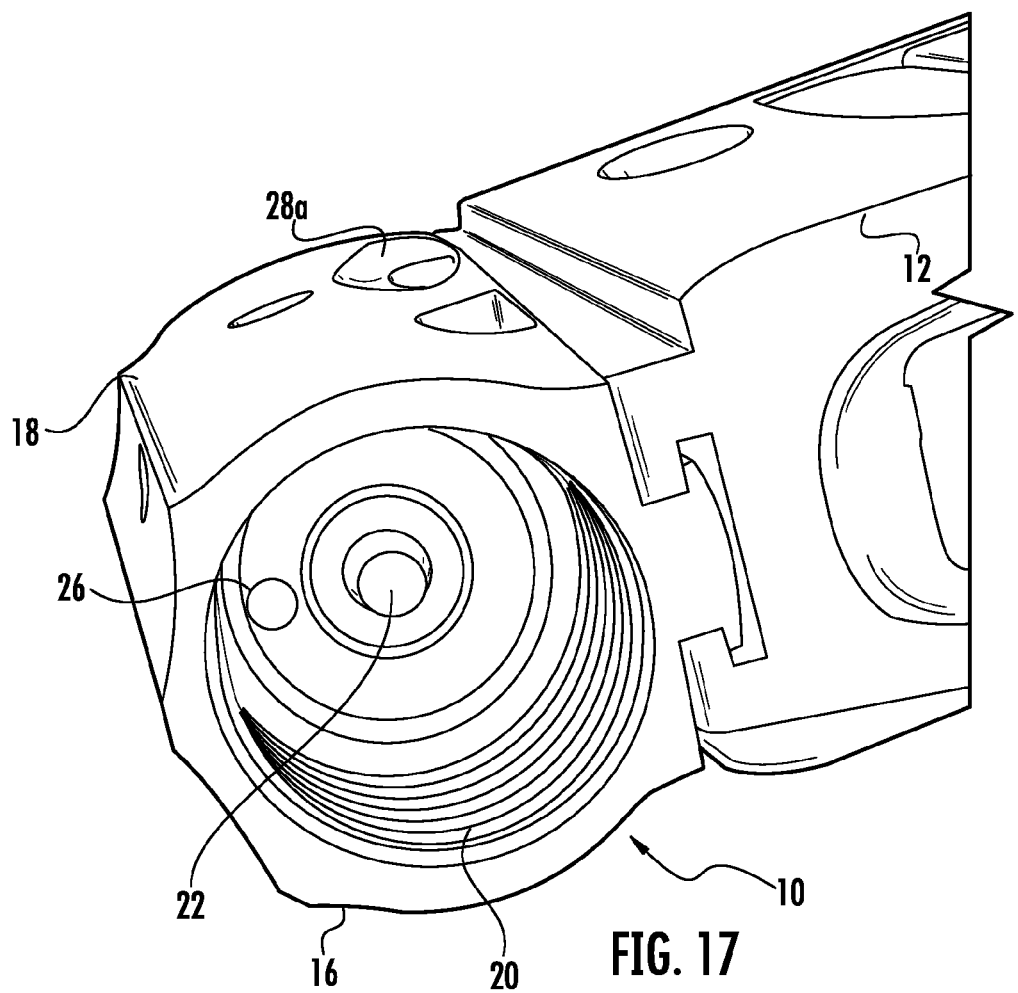
FIG. 17 is an end view of the assembly of the present invention showing the pin depressor and gas port.
Figure 18:
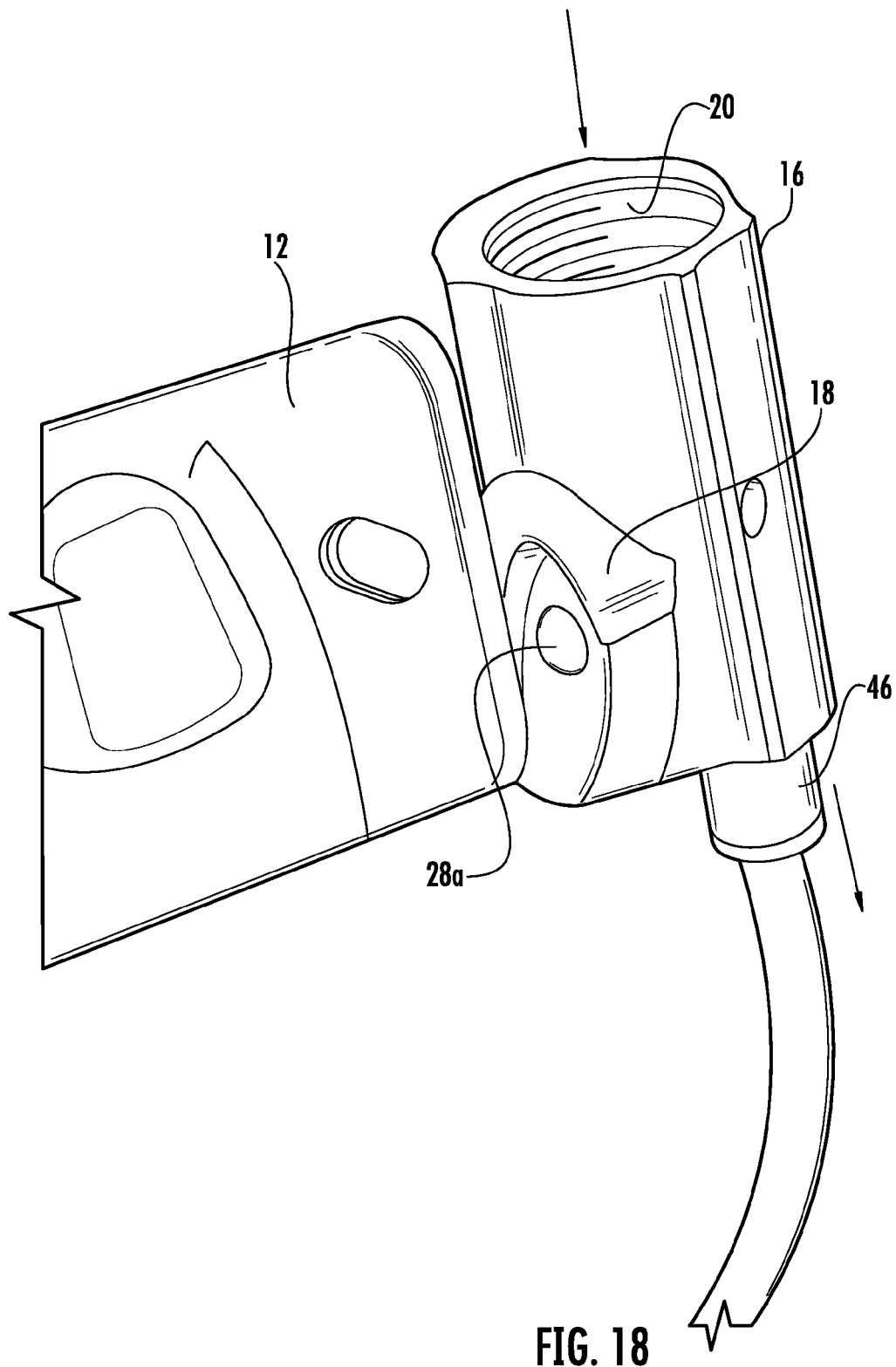
FIG. 18 is perspective view of the latch button being depressed to permit movement of the bonnet relative to the housing.

In general, FIGS. 1-10 show the assembly 10 of the present invention in an forward OFF position while FIGS. 10-15 show the assembly 10 of the present invention in a rearward ON and locked position. FIGS. 16-18 show other aspects of the invention.

Figure 2:
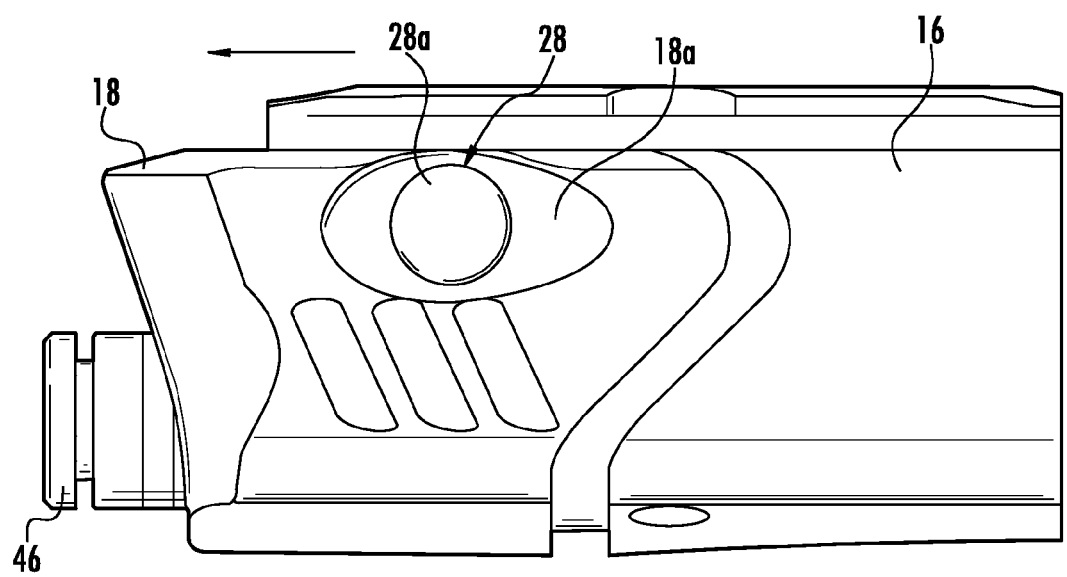
FIG. 2 is a close-up side view of the assembly of FIG. 1 of the present invention.
Figure 3:
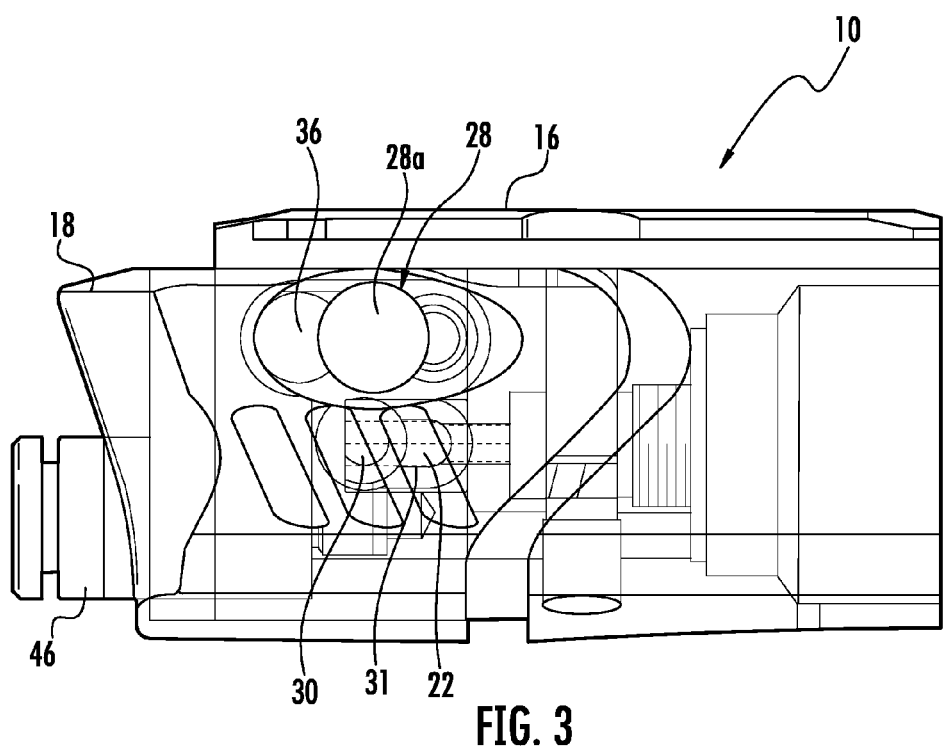
FIG. 3 is the close up side view of FIG. 2 with internal components shown in shadow for illustration purposes.
Figure 4:
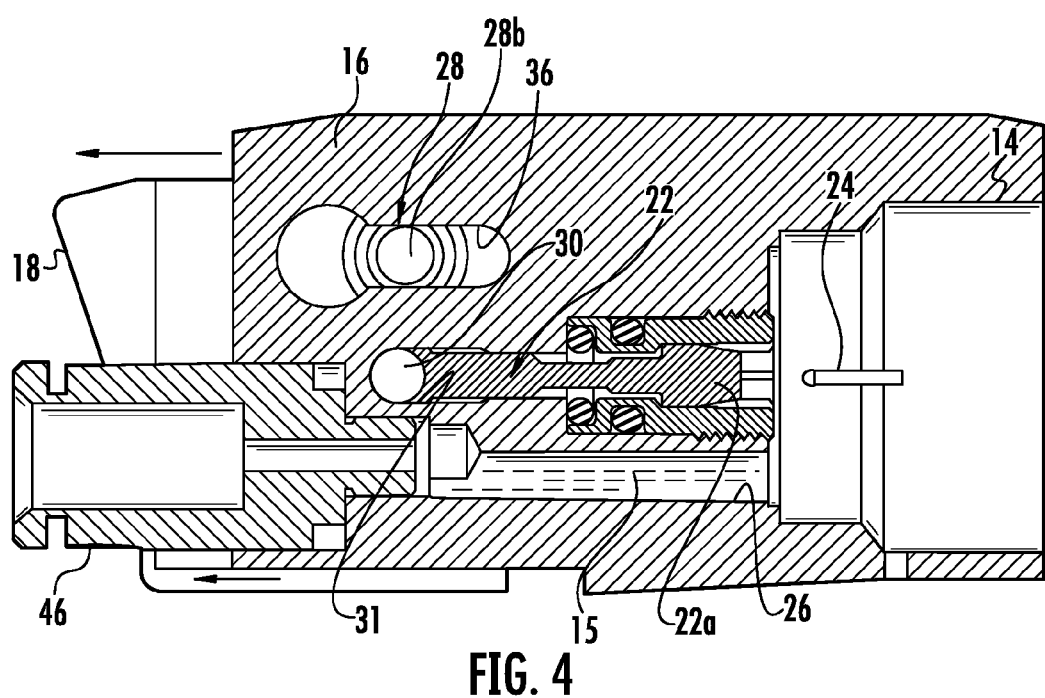
FIG. 4 is a longitudinal cross-sectional view of the assembly shown in FIG. 3 shown from the front side of the assembly.

Referring first to the assembly 10 of the present invention in a forward off position as in FIGS. 1-10. More specifically, as in FIGS. 1 and 2, the present invention generally includes a housing 16 and an actuatable bonnet 18 that slides back and forth. As can be seen in FIGS. 17 and 18, the housing 16 of the assembly includes a female threaded bore 20 to receive a gas cylinder 14, the structure of which are so well known in the art that they need not be discussed in detail herein. The depressor pin 22 of the assembly 10 actuates in and out to communicate with a pin valve 24 on the gas cylinder 14, as seen in FIGS. 4 and 14. Threaded communication of the housing 16 creates a substantially airtight seal so that when the depressor pin 22 contacts the pin valve 24 of a gas cylinder 14, gas 15 is routed through the gas port 26 and into the paintball marker 12 for use by the pneumatic system thereof. The present invention uniquely provides for control of the opening and closing of the pin valve 24 of a gas cylinder 14 by controlling movement of the depressor pin 22 according to the present invention.

Figure 1:
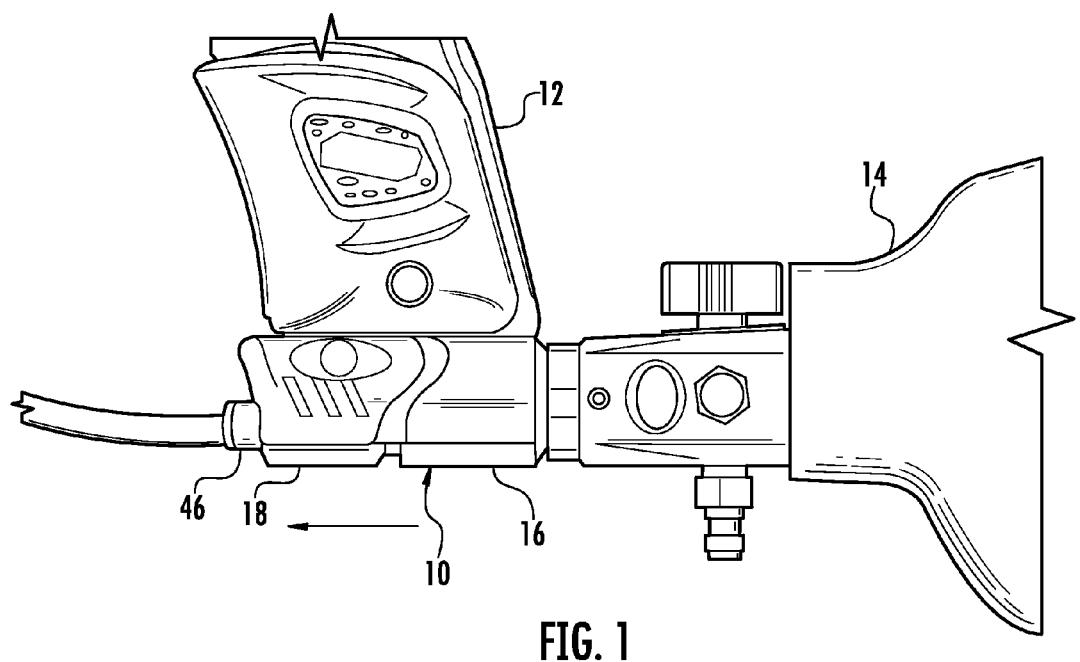
FIG. 1 is a side view of a paintball marker equipped with the latching gas ON/OFF assembly of the present invention, shown in a forward OFF position.

FIGS. 1 and 2 show the bonnet 18 in a forward position relative to the housing 16 of the assembly 10. In this condition, as will be discussed in detail below, a front free end 28a of a latch button 28 is substantially flush with the front face 18a of the bonnet 18. At this point the bonnet 18 may freely slide relative to the housing 16 of the assembly 10.

Further detail of the construction of the assembly 10, as seen in a forward OFF position, is shown in FIG. 3, which is a view of the front side of the assembly 10. A latch button 28 is positioned transversely through the bonnet 18 and the housing 16 at the top thereof. Thus, the latch button 28 controls the movement of the bonnet 18 relative to the housing 16. Also, at a lower portion of the assembly 10, is a fixed transverse dowel 30 that is connected to the depressor pin 22 that runs longitudinally through the housing 16 of the assembly 10. The dowel 30 travels in slot 31. The free end 22a of the depressor pin 22 can be seen in FIG. 17. Thus, as the bonnet 18 moves relative to the housing 16 so does the depressor pin 22 proximal to the pin valve 24 of a gas cylinder 14.

FIG. 4 further illustrates the construction of the assembly 10 when view from the front side of the assembly 10. It can be seen that the transverse button 28 are both secured to the bonnet 18 so that movement of the bonnet 18 also causes movement of both the transverse latch button 28 and the transverse dowel 30. The latch button 28 is for control of the locking of the bonnet 18 while the dowel 30 is used for opening the pin valve 24 of the gas cylinder 14. In FIG. 4, the bonnet 18 is in a center position, which results in the free end 22a of the depressor pin 22 not being in contact with the pin valve 24 of the gas cylinder 14. As a result, such a center position of the bonnet 18 does not permit gas flow from the cylinder thereby resulting in the assembly 10 being in an OFF position. However gas may be permitted to exit from the paintball marker to atmosphere with the assembly 10 in the OFF position.

Figure 5:
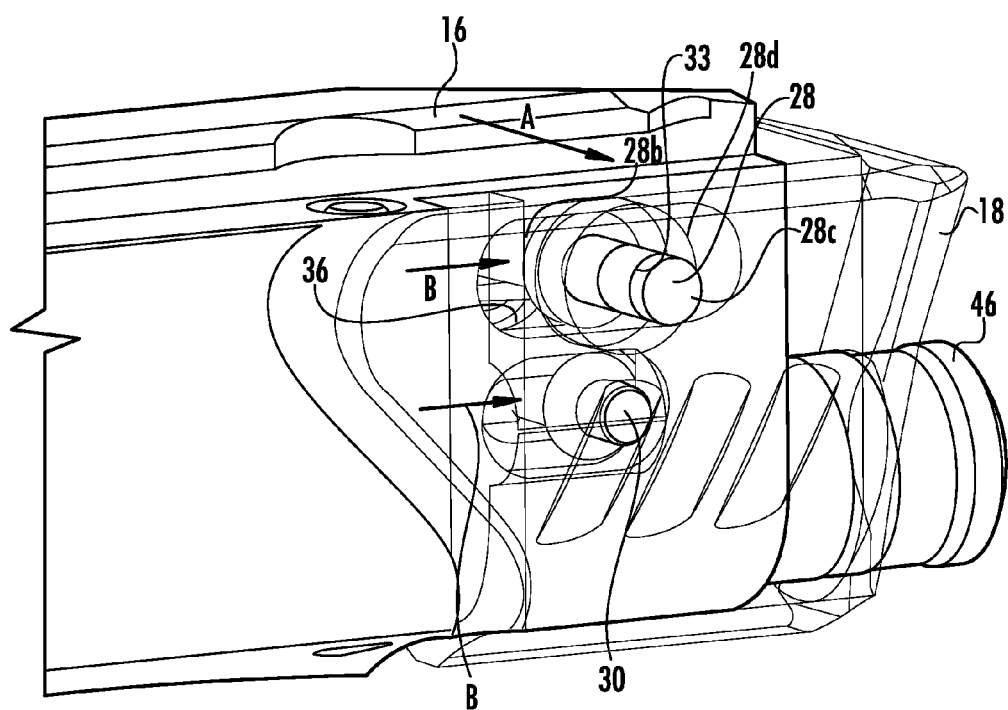
FIG. 5 is a perspective view of the assembly shown in FIG. 3 with components shown in shadow for illustration purposes shown from the rear side of the assembly.

Turning now to FIGS. 5-10 views from the opposing or rear side of the assembly 10 are shown. These figures provide more details concerning movement of the latch button 28 relative to the housing 16. In FIG. 5, a small portion of the rear end of the latch button 28 emanates through a hole 33 in the bonnet 18. FIG. 5 shows the internal component in shadow while FIG. 9 does not show the internal components in shadow. The transverse latch button 28 includes a main shaft 28b and a circumferential plate 28d, such as a circular disk, that is positioned a distance away from the rear free end 28c of the latch button 28. The latch button 28 travels transversely along arrows A and also longitudinally along arrows B.

Figure 6:
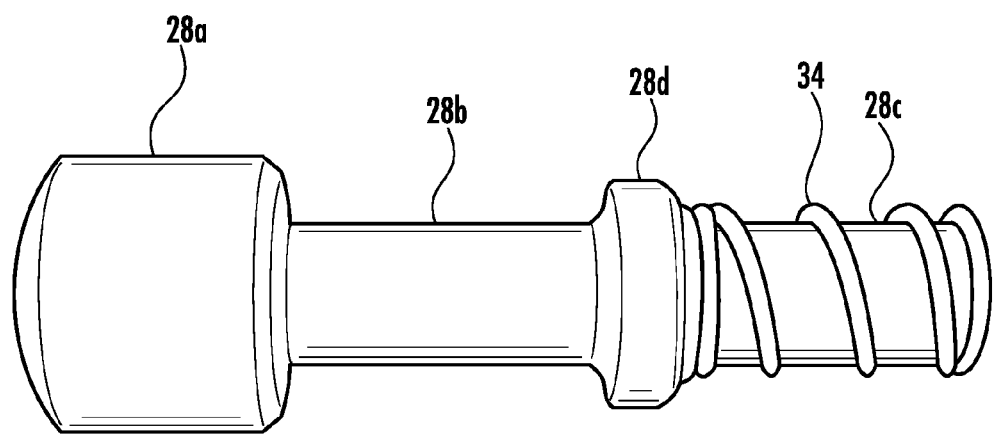
FIG. 6 is a front view of the latch button and spring-biased spring employed in the present invention.
Figure 7:
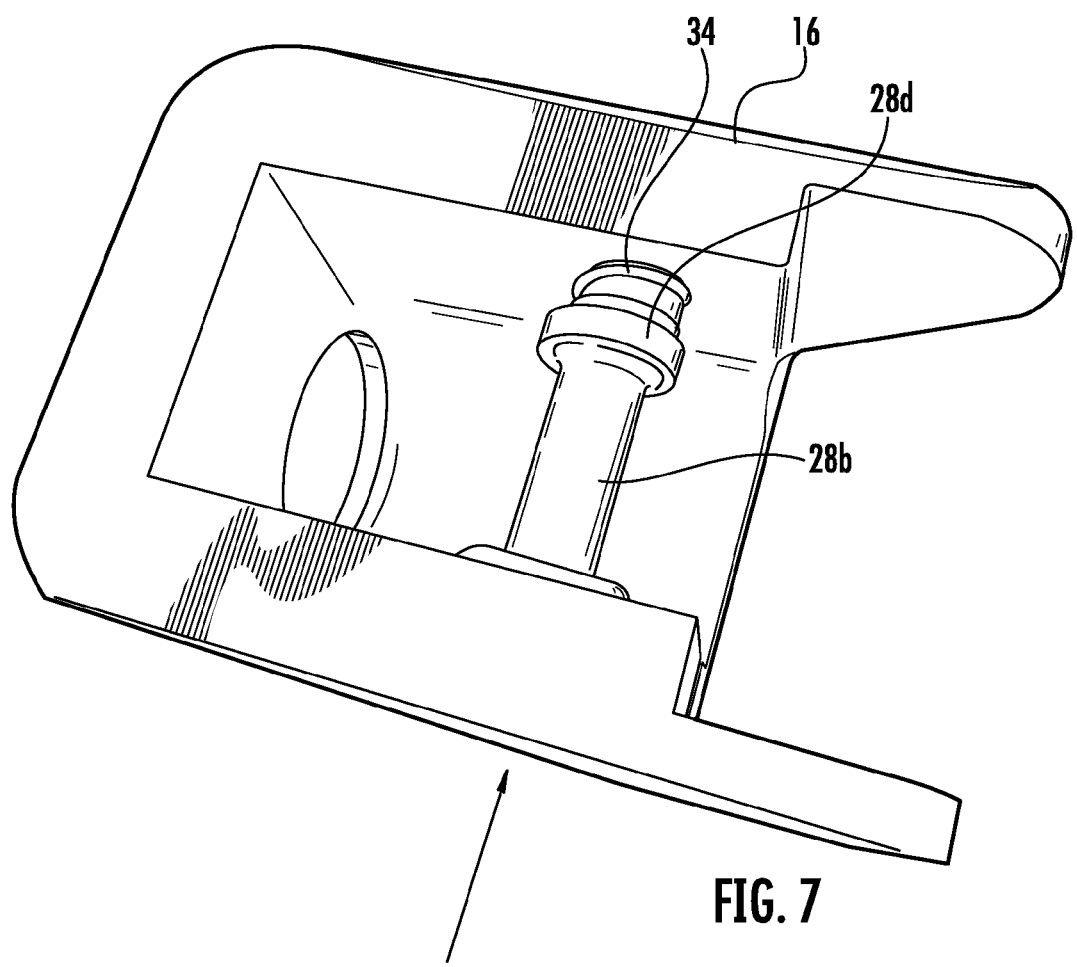
FIG. 7 is a bottom perspective view of the latch button being pressed from the front side of the assembly against the forces of the spring to lift the plate of the latch button out of its complementary seat to unlock the assembly to turn the gas OFF.
Figure 8:
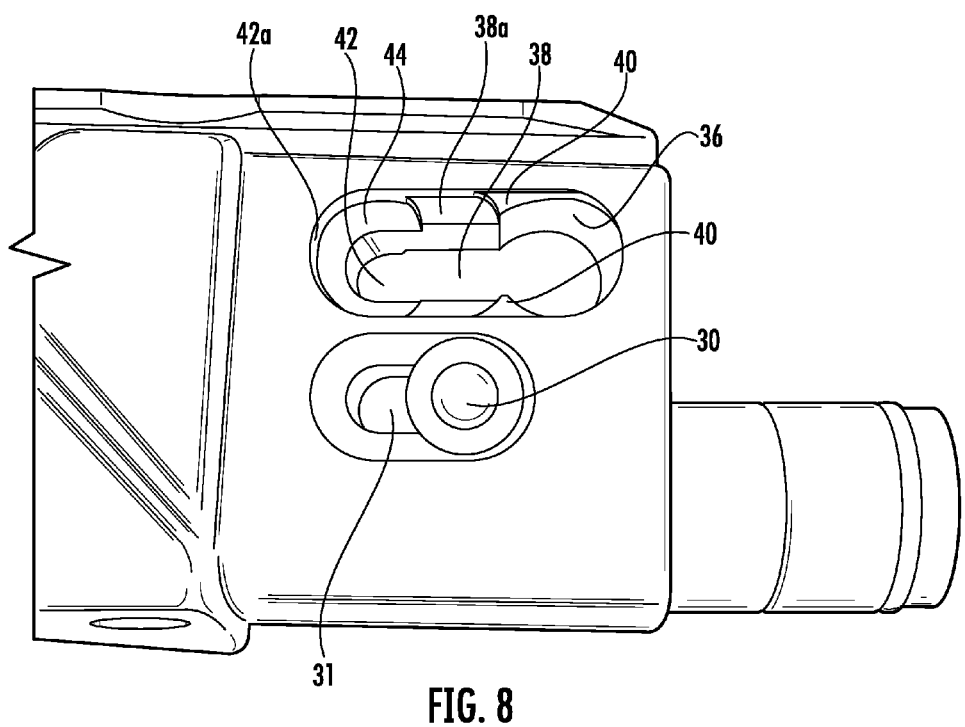
FIG. 8 is a side view of the rear side of the housing with the plate of the latch button.
Figure 9:
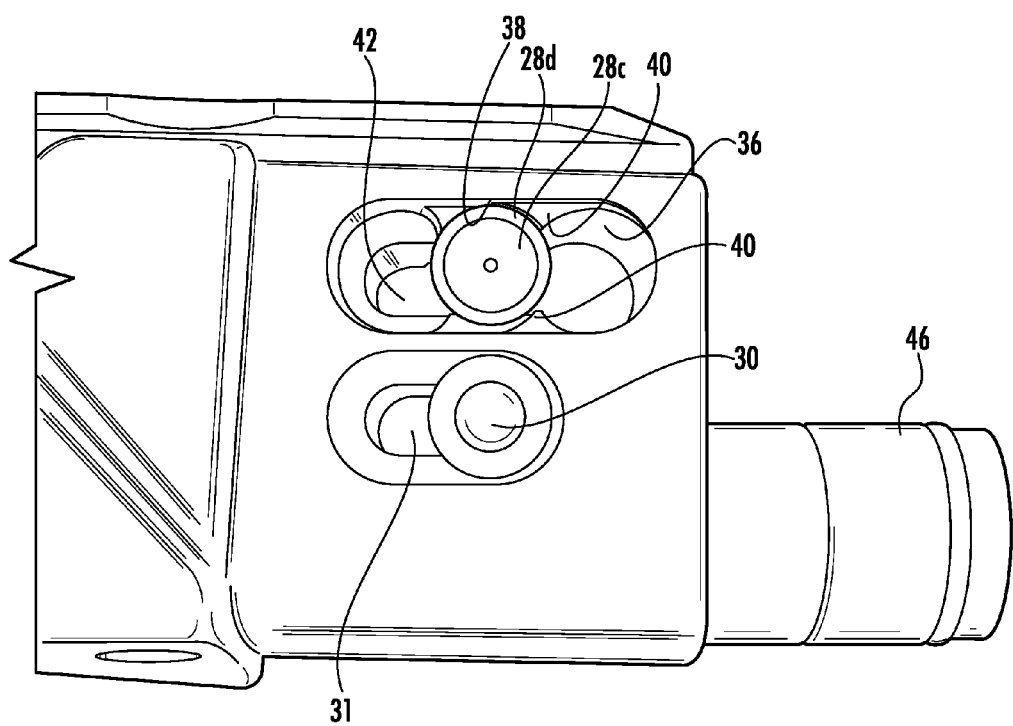
FIG. 9 is a side view of the rear side of the housing with the plate of the latch button in a middle portion of the slot when the gas is in an OFF position.
Figure 10:
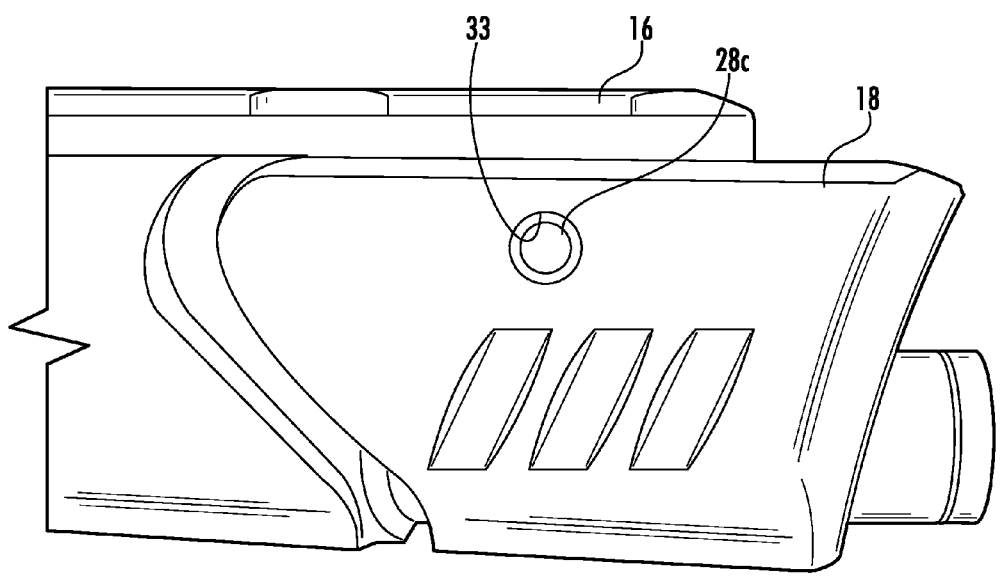
FIG. 10 is a side view of the rear side of the bonnet showing an exit port for receiving a free end of the latch button when the gas is in an OFF position.

FIG. 6 shows the construction of the latch button 28 and spring 34 for spring-biasing the disk 28d of the latch button 28 away from the bonnet 18 and toward slot 36. For ease of illustration, the spring 34 is not shown in FIG. 5, however, the spring 34 is located between the rear side of the bonnet 18 and the disk 28d. As a result, the latch button 28 is spring-biased in a direction that is opposite to that indicated by arrow A, which is showing the positioning of the latch button 28 in the OFF position. Therefore, the latch button 28 is spring-biased toward the slot 36, as can be generally seen in FIG. 7 in conjunction with FIG. 8. Most notably, FIG. 8 shows the profiling of the slot 36 on the rear side of the housing 16 of the assembly 10 of the present invention. FIG. 9 shows the positioning of the disk 28d when the assembly 10 is in the gas OFF position. Essentially, the slot 36 has profiling to control the lateral positioning of the latch button 28 depending on the longitudinal position thereof.

In FIG. 9, the latch button 28 is in a center position whereby the disk 28d attached to the latch button 28 is seated on a shallow shelf 38 that is bounded on the right side by a pair of shoulders 40 but is not bounded on the left side thereof. This center position matches with the forward OFF position. In can be seen in FIG. 9 that the left (rearward) side of the slot 36 is not bounded by shoulders 40 and feeds directly to a deeper pocket 42 with a lower floor 44 defined by the leftmost side of the slot 36. As will be discussed below in connection with FIG. 16, when the bonnet 18 is moved rearwardly, even without pressing any buttons, to turn ON the gas flow, the disk 28d will drop into the deeper pocket 42 which serves as a lock seat with assistance of the spring-biasing of the spring 34 to lock the assembly 10 into a ON position.

Figure 11:
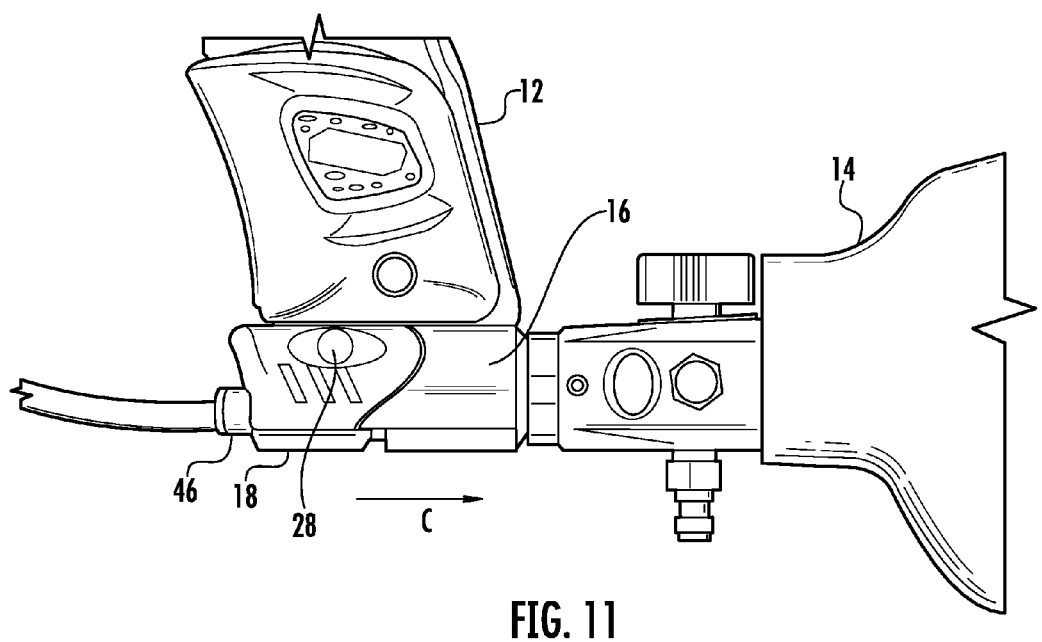
FIG. 11 is a side view of the devices installed on a paintball marker and in a gas ON position.
Figure 12:
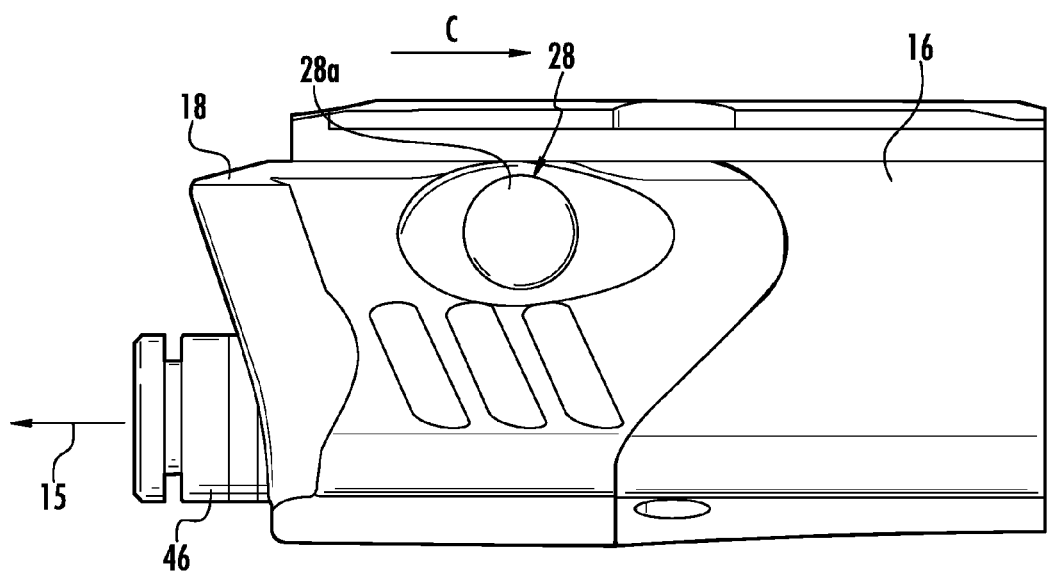
FIG. 12 is a close-up side view of the assembly of FIG. 11 of the present invention shown in a gas ON position.
Figure 13:
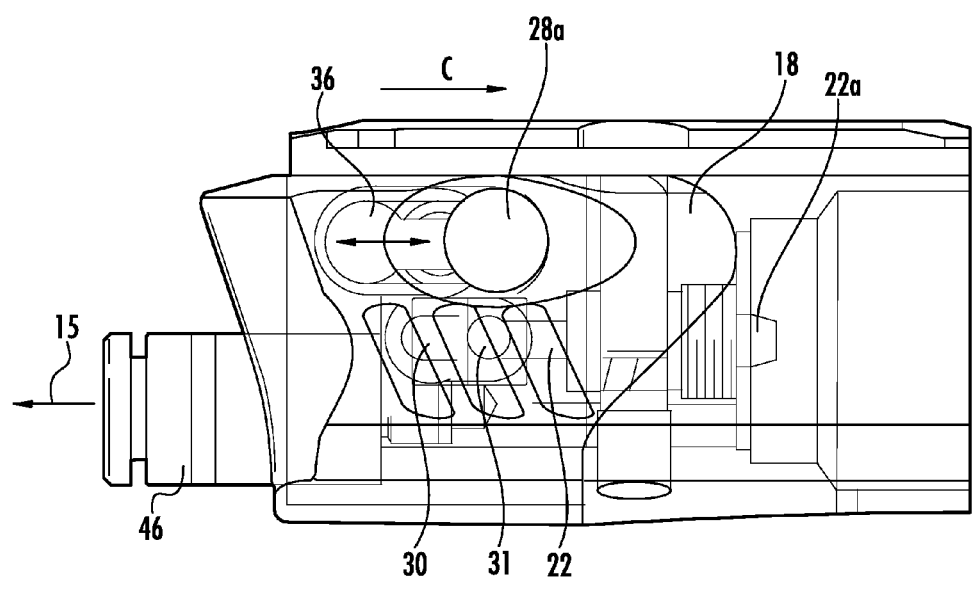
FIG. 13 is a close up side view of FIG. 11 with gas ON with internal components shown in shadow for illustration purposes.

Such movement of the bonnet 18 to a rearward ON position is shown in FIG. 11. A front view of the assembly 10 can be seen in FIGS. 11-13. To turn the gas flow ON, the bonnet 18 is moved rearwardly, as indicated by the arrow C in FIGS. 11-13. In FIG. 13, it can be seen that the latch button 28 is no longer in the center of the slot 36 but located in a rearwardmost location. As in FIG. 14, at the lower portion of the assembly 10, this location causes the dowel 30 to also move rearwardly to, in turn, cause the depressor pin 22 to impact the pin valve 24 of the gas cylinder 14 to permit the free flow of gas 15 through the gas port 26 of the assembly 10 and then out to the pneumatic system of the paintball marker 12 via a connector 46.

At the upper portion of the assembly 10, further details of the locking of the bonnet 18 in an ON position can be seen to maintain flow of gas 15. The cross-sectional view of the assembly 10 is seen in FIG. 14 to further show the rearward location of the latch button 28 in the slot 36. As indicated by arrow D, the shaft 28c of the latch button 28 has moved from the center of the slot 36 to the rearmost portion. This occurs by the user simply pulling bonnet 18 rearwardly without pressing the latch button 28. As can be seen in FIG. 16, such movement of the bonnet 18 rearwardly causes the latch button 28 to pop toward the front of the assembly 10 with the assistance of the spring 34 when the disk 28d is no longer bearing against the center shelf 38, which corresponds to the OFF position. This sliding of the bonnet 18 in the rearward direction will result in the disk 28d of the latch button 28 being pushed into the deep pocket 42 and onto the lower shelf 44 at the rear of the slot, which corresponds to the left side of the slot 36 in FIGS. 8 and 16. FIG. 15 shows this positioning of the latch button 28 where the spring 34 bears against the inside surface of the bonnet 18. Once the disk 28d is residing in the deep pocket 42 at the rearward side of the slot 36, it will stay in that position due to the spring 34 retaining it in that deep pocket 42 in the slot 36.

To turn OFF the gas supply, the front end 28a of the latch button 28 is depressed to lift the disk 28d, on proximal to the opposing end 28c of the latch button 28, out of the deep pocket 42. When the disk 28d is clear of the walls 42a of the pocket 42, the bonnet 18 may slide freely forwardly. In fact, pressing the front end 28a of the latch button 28 will automatically cause the bonnet 18 to jump forwardly into the center seat 38 due to existing back pressure of the gas supply 15 from cylinder 14. Once in the center seat 38, the bonnet 18 is centrally positioned with its dowel 30 also centrally positioned thereby removing the depressor pin 22 out of contact with the pin valve 24 of the gas cylinder 14. Therefore, the assembly 10 prevents gas flow until the bonnet 18 is urged rearwardly again when gas flow is again desired.

When the bonnet 18 is in the centre seat 38 gases stored in the ON/OFF assembly and the paintball marker may be released to atmosphere through the ON/Off assembly.

Figure 19:
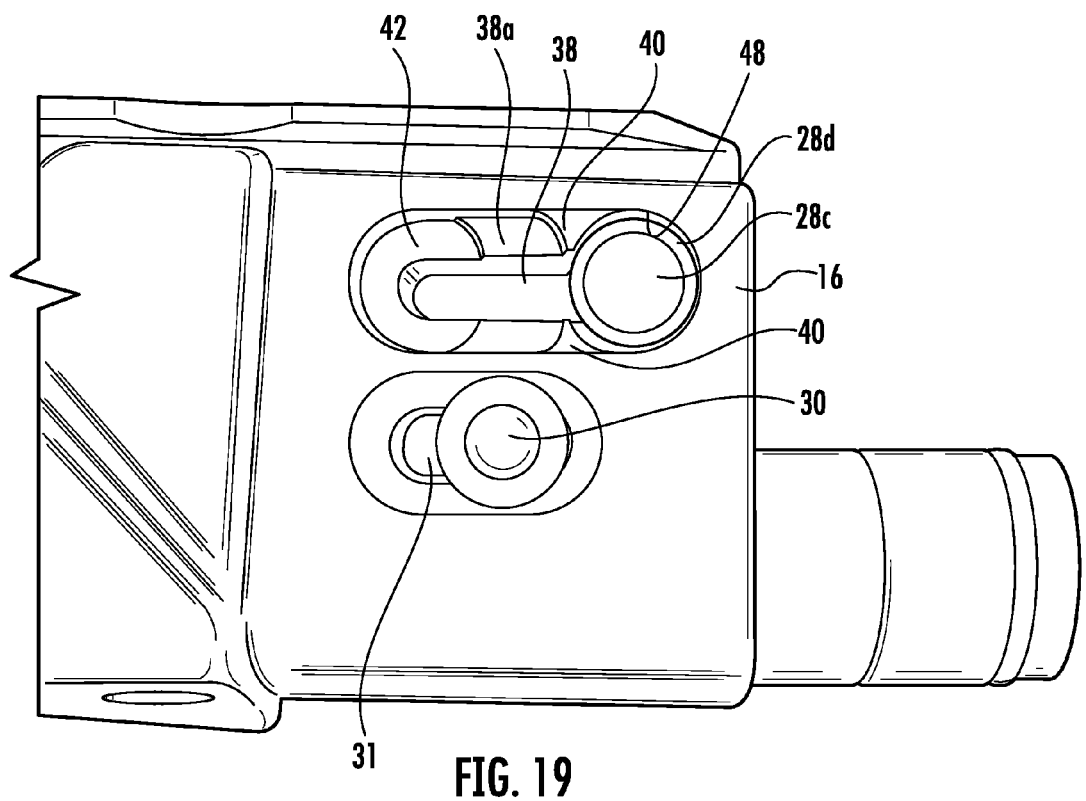
FIG. 19 is a side view of the rear side of the housing with the plate of the latch button in a rightmost portion of the slot when the assembly is not in use to permit complete removal of the latch pin and spring for disassembly and cleaning of the assembly of the present invention.

The assembly of the present invention can also be disassembled, if desired, such as for cleaning and the like. As seen in FIG. 19, the slot 36 in the housing of the assembly is also provided with a rightmost portion, which is a complete pass-through 48 without a supporting seat. This enables the disk portion 28d of the latch button 28 to complete pass through the housing 16 for removal of the entire latch button 28, including the spring 34. This is contrast to the center portion 38 of the slot 36 that has a shallow seat 38a and the rearward position 42 with a deep pocket and deeper seat 44.

To carry out the complete removal of the latch button 28, the disk 28d attached thereto must clear the bounding shoulders 40, as can be seen in FIG. 18. The travel of the front end 28a of the latch button 28 outside the front of the bonnet 18 is limited by the distance between the shallow seat 38a and the deep pocket seat 44. So, when a user presses the latch button 28 in so that it is flush with the front of the bonnet 18, the disk 28d will only travel enough out of the deep pocket 42 to reach to the shallow seat 38a. It will not be able to also clear the shoulders 40. To accomplish this, the front end 28a of the latch button 28 must be depressed beyond the front surface of the bonnet 18. This is designed to prevent accidental disassembly of the assembly 10 of the present invention.

A tool (not shown), such as the tip of pen, is used to press the front end 28a of the latch button 28 below the front surface of the bonnet 18 so that the disk 28d can travel further against the forces of the spring 4 so that it can also clear the bounding shoulders 40. Once the latch button 28 is depressed to this extent, the bonnet 18 can be moved all the way forward so that the latch button 28 can be completely routed out through the forwardmost portion 48 of the slot 36.

The simplicity of the design means that turning the assembly 10 into the ON position is as simple as pushing or pulling the bonnet 18 through a fraction of an inch to operate and engage the pin valve 24 in the tank cylinder 14, at which point the lock is automatically engaged to retain the assembly 10 in the ON position. Turning the system to the OFF position is carried out by simply depressing the front side 28a of the latch button 28.

The present invention can be manufactured of any suitable material for use in paintball markers. For example, the components of the assembly 10 can be made of metal, such as machined aluminum or steel, as well as plastic. Also, the engagement of the pin 24 of the tank valve 14 can be carried out in many different ways when a bonnet 18 is moved rearwardly.

It would be appreciated by those skilled in the art that various changes and modifications can be made to the illustrated embodiments without departing from the spirit of the present invention. All such modifications and changes are intended to be covered by the present invention.

What is claimed is:

1. A latching gas ON/OFF assembly, comprising:
a housing having a female threaded bore for receiving a male threaded neck of a gas tank cylinder having a tank valve with a pin defining a cylinder interconnection;
a bonnet slidably connected to the housing; the bonnet sliding between a forward OFF position and rearward ON position; the ON position of the bonnet being closer to the female threaded bore than the OFF position of the bonnet;
a pin depressor connected to the bonnet that communicates directly with the pin of the gas tank;
a latch configured and arranged to lock the bonnet in and release the bonnet from the ON position; the latch being a transverse latching button that is spring biased toward a locked position;

whereby sliding the bonnet to the rearward ON position causes the pin depressor to contact the pin of the tank valve to permit gas to flow therefrom thereby enabling the cylinder interconnection to be locked and unlocked.

2. The latching gas ON/OFF assembly of claim 1, further comprising:

the latching button including a first and second end;

the housing defining a stepped slot with a narrowed portion and a seat portion; the latching button being slidably residing therein;

a plate positioned proximal to one of the ends of the latching button; one of the ends of the latching button being routed through and aperture through the bonnet; the plate being substantially complementary in shape to the seat portion of the housing; the plate of the latching button being spring-biased toward and into the seat; and whereby positioning of the plate into the seat locks the bonnet relative to the housing.

3. The latching gas ON/OFF assembly of claim 2, wherein the plate and seat portion are circular in shape.

4. The latching gas ON/OFF assembly of claim 1, further comprising:

a dowel connected between the pin depressor and the housing.

5. The latching gas ON/OFF assembly of claim 1, wherein the bonnet is urged toward an unlocked position from momentary gas pressure upon release of locking engagement of the bonnet to the housing.

\* \* \* \* \*